Jan. 12, 1960 TAKEO NOJIMA 2,920,918
CAR WHEELS
Filed March 11, 1958 2 Sheets-Sheet 1

INVENTOR:
TAKEO NOJIMA
BY
Richardson, David and Nardon
Atty's.

Jan. 12, 1960   TAKEO NOJIMA   2,920,918
CAR WHEELS

Filed March 11, 1958   2 Sheets-Sheet 2

INVENTOR:
TAKEO NOJIMA
BY
Richardson, David and Vardon
ATTY'S

United States Patent Office 2,920,918
Patented Jan. 12, 1960

2,920,918

CAR WHEELS

Takeo Nojima, Kawasaki City, Japan, assignor to Amagasaki Seitetsu Kabushiki Kaisha, Amagasaki City, Japan, a corporation of Japan Application March 11, 1958, Serial No. 720,724

5 Claims. (Cl. 295—1)

This invention relates to car wheels and more particularly to car wheels operative in aligned pairs without need of any axle connecting each pair of wheels in alignment.

The main object of the present invention is to provide car wheels with minimum frictional resistance against their rotation.

Another object of the present invention is to provide car wheels which make the over-all height of the truck or the height of a car floor from the ground, minimum.

A further object of the present invention is to provide car wheels which can carry car load directly or not through any axle.

A further object of the present invention is to provide car wheels of the kind specified with relatively simple, economical, and strong construction.

These and other objects and particularities of the present invention will best be understood from the following detailed descriptions with reference to the accompanying drawings, in which.

Figure 1:
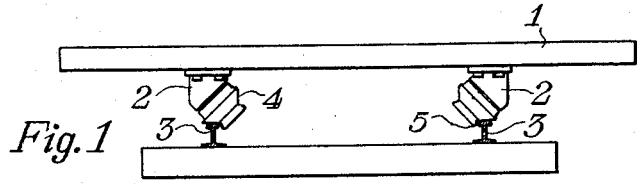
Fig. 1 is a diagrammatic end view of a railway car truck provided with car wheels embodying the present invention.

Referring to Fig. 1, the truck member 1 of a railway car is mounted on and supported directly by a plurality of aligned pairs of wheels 2 which ride on a pair of rails 3 and engage them at treads 4 and flanges 5 as in conventional car wheels.

Since all the wheels 2 are of the same construction except that the opposite side wheels have their axes of rotation inclined to the vertical in opposite senses, it will be sufficient to describe one wheel 2 in detail.

Figure 2:
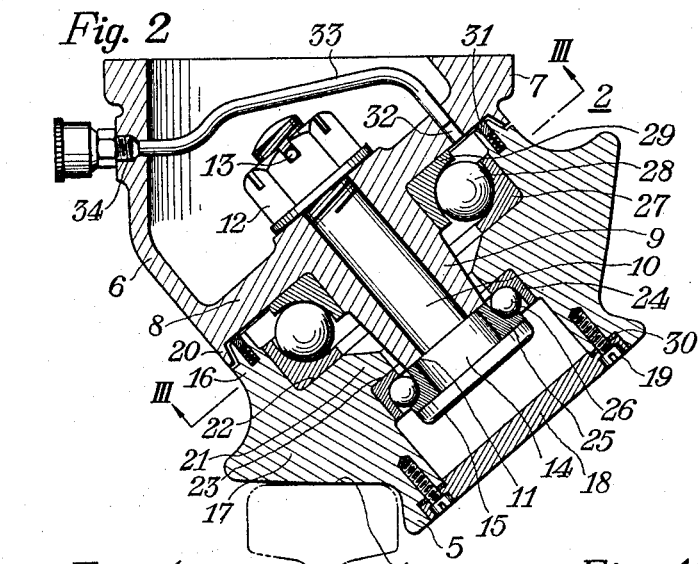
Fig. 2 is a vertical central sectional view of a car wheel embodying the present invention.
Figure 3:
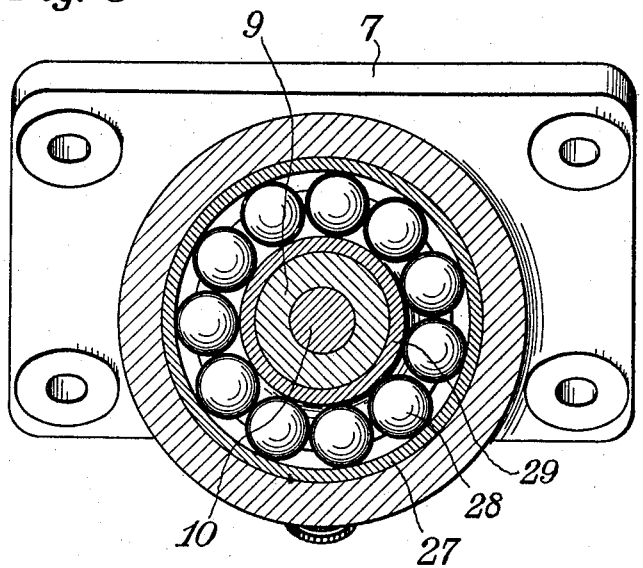
Fig. 3 is a cross-sectional view taken along the line III—III in Fig. 2.

Referring to Figs. 2 and 3, the wheel 2 comprises a cylindrical body 6 of generally triangular longitudinal section. The body 6 has a horizontal top end provided with fastening flange 7 through which a plurality of fastening bolts, not shown, secure the body 6 to the truck member 1.

The body 6 has its bottom wall 8 inclined to the horizon by an angle from about 30° to about 40°, and is provided at the centre of bottom wall 8 with a bore surrounded by a cylindrical sleeve 9 projecting downwards from the wall at a right angle thereto.

A centre shaft 10 passes through the bore of sleeve 9. The shaft 10 has its lower end enlarged to form a shoulder 11 to abut the lower end face of sleeve 9, and is provided at the upper end portion with screw thread, with which a nut 12 engages to secure the shaft 10 to the body 6. The nut 12 is locked by a cotter pin 13 against loosening.

The enlarged lower end portion 14 of centre shaft 10 has a cylindrical form, and its bottom end is further enlarged to provide a race support 15.

A hollow wheel member 16 has a frusto-conical tread portion 17 converging downwards and provides substantially conical tread 4 which engages rail 3. The lower end of tread portion 17 is continued by the flange portion 5 adapted to prevent derailing. The bottom opening of wheel member 16 surrounded by flange portion 5 is closed by a cover plate 18 fixed to the member by screws 19.

The wheel member 16 has its upper portion converged upwards to merge in the bottom end of wheel body 6. The bottom end of body 6 is provided with downwardly extending flange 20, and the top end of wheel member 16 is reduced in diameter to fit inside the flange 20.

The hollow wheel member 16 has an inner shelf portion 21 which provides an upper annular shoulder 22 and a lower annular shoulder 23. The lower shoulder 23 forms a race support opposite the race support 15 on the centre shaft, and holds an upper annular race 24 which cooperates with a lower annular race 25 held in position by the race support 15, to support and guide a plurality of steel balls 26 arranged in a circle therebetween.

In order to enable the assembling of the above-mentioned parts, the race support 15 may be made detachable with respect to the lower cylindrical portion 14 of centre shaft 10 by suitable means, not shown. The bearing faces of the races 24 and 25 are of generally angular configuration, but have partly circular cross-sectional shape adapted to cooperate with steel balls 26. Thus the wheel member 16 is held in place on the centre shaft 10. It is to be noted that the bearing assemblage 24—25—26 merely serves to guide the wheel member 16 and hold the same against falling out, but is not loaded at all during operation, as will be obvious from the explanation of operation to be given hereinafter.

On the upper annular shoulder 22 is mounted a lower annular race 27 for a plurality of loading steel balls 28 arranged in a circle. The upper annular race 29 is held in place at the corner formed by the bottom wall 8 and the cylindrical sleeve 9 of the wheel body 6. The bearing faces of races 27 and 29 are of generally angular configuration, but have partly circular cross-sectional shape to cooperate with steel balls 28.

It is to be noted that the circles of balls 26 and 28 are in planes perpendicular to the axis of the centre shaft 10.

The chamber defined in the wheel member 16 is filled with lubricating medium such as grease, and suitable packing means 30 and oil seal means 31 are provided at appropriate places. The grease may be fed into the chamber through a hole 32 formed in the wall 8 and connected to a copper pipe 33 from a grease cap 34 of conventional construction.

Figures 4A, 4B:
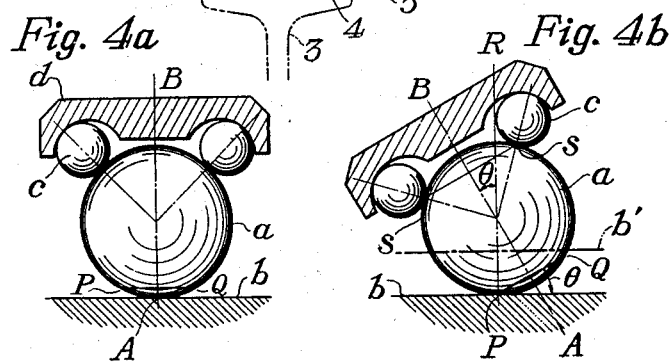
Figs. 4a and 4b are diagrams for explaining the principle of operation of the car wheel according to the invention.

The operation of the new car wheel according to the invention may best be understood with reference to Figs. 4a and 4b. In Fig. 4a, a large ball $a$ rides on a bearing surface $b$ in contact with the surface $b$ at a point A through which the vertical centre line A—B passes. Upon the ball $a$ rides a plurality of small balls $c$ arranged in a circle and held in place by an inverted cup member $d$ held stationary. It will be obvious that when the large ball $a$ is rotated about the vertical axis A—B, the frictional resistance against the rotation is minimum, since there occurs substantially no sliding between the relatively movable parts. Inasmuch as, however, the large ball $a$ merely rotates about the fixed point of contact A with the bearing surface $b$, there cannot take place any translational movement between the ball $a$ and the bearing surface $b$.

Now, if we consider an imaginary circle P—Q on the ball surface parallel to the surface $b$, the point P or Q will move along the circle P—Q. If the point P is selected as the point of contact with the bearing surface $b$, it is obvious that a relative translational movement takes place between the ball $a$ and the surface $b$. Such an arrangement is shown in Fig. 4b.

It will readily be understood that, even in the arrangement shown in Fig. 4b, the frictional resistance against rotation is minimum provided that the large ball $a$ rotates about the centre line A—B. In order to assure this, the large ball $a$ should always be in contact with all of the small balls $c$ in spite of the inclination of the centre line A—B. According to my discovery, when the angle $\theta$ between the centre line A—B and the vertical line P—R passing through the point of contact P of the ball $a$ with the surface $b$ smaller than about 40° in the vertical plane perpendicular to the direction of the translational movement of bearing surface $b$ relative to the ball $a$, the large ball $a$ is always in contact with all of small balls $c$. In order that the circle P—Q may be large as far as possible, I have found that the angle $\theta$ should at least be 30°.

The point of contact P revolves along the circle P—Q which is, as is obvious, in a plane at the angle $\theta$ with respect to the bearing surface $b$. On the other hand, the plane of circle P—Q is parallel to a plane S—S passing through all the points of contact of ball $a$ with small balls $c$. In other words, the points S revolve along the circle S—S.

Now, it is of no doubt that the ball $a$ is not required to preserve its spherical shape. The essential thing is that the small balls $c$ are always in contact with the circle S—S which, then, may obviously be replaced by an annular race such as shown in Fig. 2 at 27. In addition, the bearing surface $b$ is not also required in point contact with the ball $a$ which, now, may not be a sphere, but may be of a frusto-conical shape such as is shown in Fig. 2 as tread portion 17 with tread 4 in line contact with the top of rail 3, in which the line of contact may be in a plane $b'$ (Fig. 4b) above the surface $b$, because of the fact that the wheel member 16 substituted for the ball $a$ is held against lateral shift by the centre shaft 10 through the bearing assembly 24—25—26.

The above description has been given merely for the purpose of explanation, but not for limitation, and regardless of such a theoretical explanation, it is to be understood that the new car wheel according to the invention has been provided in practice having minimum frictional resistance (about one tenth the frictional resistance of conventional ball or roller bearing car wheels) against rotation.

What I claim as my invention is:

1. A car wheel comprising a stationary body, a cylindrical sleeve projecting downwardly therefrom at an angle of approximately 30 to 40 degrees with respect to the vertical, a generally frusto-conical hollow wheel member having a conical tread with its axis coincident with that of said cylindrical sleeve, a center shaft passing through and fixedly secured to said cylindrical sleeve, a first pair of cooperating annular races of angular cross section respectively provided on said wheel member and said body, a plurality of load-supporting solid balls disposed between said annular races and arranged in a first circle, said circle of balls being in a plane perpendicular to said axis, a second pair of cooperating annular races of angular cross section respectively provided on said wheel member and said center shaft, and a plurality of non-loaded solid balls disposed between said second pair of annular races and arranged in a second circle perpendicular to said axis and positioned below said first circle of solid load-supporting balls.

2. A car wheel according to claim 1 including a cover plate threadably secured by screws to said conical tread at its lower end.

3. A car wheel according to claim 2 including sealing means disposed respectively between said cover plate and said conical tread and said stationary body and said tread.

4. The car wheel according to claim 1, wherein the chamber defined by said stationary body and said hollow wheel member is filled with lubricating medium.

5. The car wheel according to claim 1, wherein said stationary body comprises a horizontal top fastening flange and an inclined bottom wall from which said cylindrical sleeve projects downwards.

References Cited in the file of this patent

UNITED STATES PATENTS

| | | |
|---|---|---|
| 554,644 | Belk | Feb. 18, 1896 |
| 2,631,328 | Kramcsak | Mar. 17, 1953 |

FOREIGN PATENTS

| | | |
|---|---|---|
| 78,660 | Netherlands | Aug. 15, 1955 |